United States Patent
Zhong et al.

(10) Patent No.: US 10,181,211 B2
(45) Date of Patent: Jan. 15, 2019

(54) METHOD AND APPARATUS OF PROMPTING POSITION OF AERIAL VEHICLE

(71) Applicant: SZ DJI TECHNOLOGY CO., LTD., Shenzhen (CN)

(72) Inventors: Heli Zhong, Shenzhen (CN); Zhiyuan Zhang, Shenzhen (CN); Liutao Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/493,323

(22) Filed: Apr. 21, 2017

(65) Prior Publication Data

US 2017/0221246 A1 Aug. 3, 2017

Related U.S. Application Data

(63) Continuation of application No. PCT/CN2014/089579, filed on Oct. 27, 2014.

(51) Int. Cl.
*G06T 11/60* (2006.01)
*B64C 39/02* (2006.01)
(Continued)

(52) U.S. Cl.
CPC ............ *G06T 11/60* (2013.01); *B64C 39/024* (2013.01); *B64D 47/08* (2013.01); *G01C 23/00* (2013.01);
(Continued)

(58) Field of Classification Search
CPC ... G06T 11/60; G06T 2200/24; B64C 39/024; B64C 2201/146; B64C 2201/123;
(Continued)

(56) References Cited

U.S. PATENT DOCUMENTS 7,460,148 B1 * 12/2008 Clark .................... H04N 7/183
340/539.13
9,529,357 B1 * 12/2016 Eggers ................. G05D 1/0044
(Continued)

FOREIGN PATENT DOCUMENTS

CN 1995919 A 7/2007
CN 102156481 A 8/2011
(Continued)

OTHER PUBLICATIONS

The World Intellectual Property Organization (WIPO) International Search Report for PCT/CN2014/089579 dated Jul. 22, 2015 5 Pages.

*Primary Examiner* — Courtney D Heinle
(74) *Attorney, Agent, or Firm* — Anova Law Group, PLLC (57) ABSTRACT

Method and apparatus of prompting a position of an aerial vehicle are provided. The method may include: obtaining first position information of the aerial vehicle and second position information of a ground end; and presenting a relative position relationship between the aerial vehicle and the ground end on a preset map according to the first position information and the second position information. Flight status including flight position and other suitable information of an aerial vehicle may therefore be directly provided.

21 Claims, 3 Drawing Sheets

(51) Int. Cl.

| | | |
|---|---|---|
| *B64D 47/08* | (2006.01) | |
| *G01C 22/02* | (2006.01) | |
| *G05D 1/00* | (2006.01) | |
| *G08G 5/00* | (2006.01) | |
| *G09G 5/14* | (2006.01) | |
| *H04N 5/45* | (2011.01) | |
| *G01C 23/00* | (2006.01) | |
| *G06F 3/147* | (2006.01) | |

(52) U.S. Cl.
CPC ......... *G05D 1/0038* (2013.01); *G05D 1/0044* (2013.01); *G06F 3/147* (2013.01); *G08G 5/0013* (2013.01); *G08G 5/0026* (2013.01); *G08G 5/0069* (2013.01); *G08G 5/0082* (2013.01); *G09G 5/14* (2013.01); *H04N 5/45* (2013.01); *B64C 2201/123* (2013.01); *B64C 2201/145* (2013.01); *B64C 2201/146* (2013.01); *G06T 2200/24* (2013.01); *G09G 2340/125* (2013.01); *G09G 2340/14* (2013.01)

(58) Field of Classification Search
CPC .. B64C 2201/145; B64D 47/08; G01C 23/00; G05D 1/0038; G05D 1/0044; G06F 3/147; H04N 5/45; G08G 5/0013; G08G 5/0026; G08G 5/0069; G08G 5/0082; G09G 5/14; G09G 2340/125; G09G 2340/14

See application file for complete search history.

(56) References Cited

U.S. PATENT DOCUMENTS

| | | | | |
|---|---|---|---|---|
| 9,816,816 B2* | 11/2017 | Hayes | ............... | G01C 21/00 |
| 2003/0212478 A1* | 11/2003 | Rios | ............... | G05D 1/0044 |
| | | | | 701/2 |
| 2004/0167714 A1* | 8/2004 | Macphail | ............ | G01C 21/20 |
| | | | | 701/469 |
| 2006/0066762 A1* | 3/2006 | Suwa | ............... | B60K 35/00 |
| | | | | 348/837 |
| 2006/0206244 A1* | 9/2006 | Arvidsson | ............ | G05D 1/0016 |
| | | | | 701/2 |
| 2007/0195203 A1* | 8/2007 | Walker | ............... | H04H 20/26 |
| | | | | 348/725 |
| 2008/0215204 A1* | 9/2008 | Roy | ............... | G05D 1/0044 |
| | | | | 701/28 |
| 2010/0084513 A1* | 4/2010 | Gariepy | ............ | B64C 39/024 |
| | | | | 244/190 |
| 2010/0250022 A1* | 9/2010 | Hines | ............... | G05D 1/101 |
| | | | | 701/2 |
| 2011/0119711 A1* | 5/2011 | Marshall | ............ | H04N 5/44591 |
| | | | | 725/41 |
| 2012/0035785 A1* | 2/2012 | Lee | ............... | G05D 1/0016 |
| | | | | 701/2 |
| 2012/0089274 A1* | 4/2012 | Lee | ............... | B64C 39/024 |
| | | | | 701/2 |
| 2012/0114229 A1 | 5/2012 | Zhou | | |
| 2012/0221180 A1* | 8/2012 | Lee | ............... | G05D 1/0033 |
| | | | | 701/3 |
| 2012/0280087 A1* | 11/2012 | Coffman | ............ | G05D 1/0016 |
| | | | | 244/175 |
| 2013/0066550 A1* | 3/2013 | Takada | ............ | G01C 21/367 |
| | | | | 701/454 |
| 2014/0018979 A1* | 1/2014 | Goossen | ............ | G08G 5/0034 |
| | | | | 701/3 |
| 2014/0184850 A1* | 7/2014 | Raju | ............... | H04N 5/2624 |
| | | | | 348/239 |
| 2015/0142211 A1* | 5/2015 | Shehata | ............ | H04N 7/181 |
| | | | | 701/2 |
| 2015/0347074 A1* | 12/2015 | Park | ............... | G06F 3/14 |
| | | | | 348/565 |
| 2016/0100121 A1* | 4/2016 | Shintani | ............ | H04N 5/45 |
| | | | | 348/565 |
| 2016/0259330 A1* | 9/2016 | Lacaze | ............ | G05D 1/0016 |
| 2016/0306351 A1* | 10/2016 | Fisher | ............ | G05D 1/0016 |
| 2016/0363447 A1* | 12/2016 | Hayes | ............ | G08G 5/0013 |
| 2016/0364248 A1* | 12/2016 | Zimmerman | ........ | G05D 1/0027 |
| 2017/0105053 A1* | 4/2017 | Todd | ............... | H04N 21/816 |
| 2017/0131717 A1* | 5/2017 | Kugelmass | ............ | G05D 1/0088 |
| 2017/0192424 A1* | 7/2017 | Poole | ............... | G05D 1/0044 |
| 2017/0329324 A1* | 11/2017 | Bachrach | ............ | G01C 21/165 |

FOREIGN PATENT DOCUMENTS

| | | |
|---|---|---|
| CN | 103185600 A | 7/2013 |
| CN | 103344240 A | 10/2013 |
| CN | 103344250 A | 10/2013 |
| CN | 103345826 A | 10/2013 |
| CN | 103365298 A | 10/2013 |
| CN | 103575264 A | 2/2014 |
| CN | 104007766 A | 8/2014 |

* cited by examiner

METHOD AND APPARATUS OF PROMPTING POSITION OF AERIAL VEHICLE

CROSS-REFERENCE TO RELATED APPLICATION

This is a continuation application of International Application No. PCT/CN2014/089579, filed on Oct. 27, 2014, the entire contents of which are incorporated herein by reference.

TECHNICAL FIELD

The present disclosure generally relates to the field of communications and, in particular relates to a method and apparatus of prompting a position of an aerial vehicle.

BACKGROUND

First person view (FPV) is a playing method based on a remote-control aviation model or a model vehicle mounted with a wireless video camera and a video transmitter, by viewing a screen on the ground to operate the remote-control models. With the development in society, science, technology, and economy, more and more people like aeromodelling, and aeromodelling devices may easily cost, e.g., tens of thousands RMB yuan. Obtaining a flight status of an aeromodelling aerial vehicle is more and more important.

Currently, in a beyond-line-of-sight flight, a user is, however, unable to obtain some flight parameters of an aeromodelling aerial vehicle, and also unable to directly display a status of the aeromodelling aerial vehicle to an operator. This is inconvenient for operating and controlling the flight of the aerial vehicle.

SUMMARY

The technical problem solved by the present disclosure is to provide a method and apparatus of prompting a position of an aerial vehicle, such that flight status including flight position and other suitable information of the aerial vehicle may be directly provided.

In order to solve the above described technical problems, the present disclosure provides a method of prompting a position of an aerial vehicle including: obtaining first position information of the aerial vehicle and second position information of a ground end; and presenting a relative position relationship between the aerial vehicle and the ground end in a preset map according to the first position information and the second position information.

In some embodiments, the method may further include: obtaining third position information of a set return target point for the aerial vehicle, and displaying the set return target point on the preset map showing the relative position relationship between the aerial vehicle and the ground end, according to the third position information.

In some embodiments, presenting the relative position relationship between the aerial vehicle and the ground end on a preset map and displaying the return target point may include: drawing a first icon corresponding to the aerial vehicle on the preset map according to the first position information; drawing a second icon corresponding to the ground end on the preset map according to the second position information; drawing a third icon corresponding to the return target point on the preset map according to the third position information; displaying the preset map, drawn with the first icon, the second icon and the third icon.

In some embodiments, the method may further include: obtaining first orientation information of the aerial vehicle and second orientation information of the ground end; displaying orientation of the aerial vehicle on the preset map according to the first orientation information; and displaying the orientation of the ground end on the preset map according to the second orientation information.

In some embodiments, the first icon and the second icon may be icons with direction indication; the displaying an orientation of the aerial vehicle on the preset map according to the first orientation information may include: adjusting a pointing direction of the first icon according to the first orientation information; and the displaying the orientation of the ground end on the preset map according to the second orientation information may include: adjusting the pointing direction of the second icon according to the second orientation information.

In some embodiments, the displaying the present map drawn with the first icon, the second and the third icon may include: displaying the preset map, the first icon, the second icon and the third icon within a displaying interface by at least one of the following three displaying modes: in a first displaying mode, setting the first orientation information as a reference direction, and adjusting a displaying direction of the preset map, a pointing direction of the second icon taking the first orientation information as a reference; in a second displaying mode, setting the second orientation information as the reference direction and adjusting the displaying direction of the preset map and the pointing direction of the first icon taking the second orientation information as a reference; in a third displaying mode, setting a predetermined geographic direction on the preset map as the reference direction, and adjusting the pointing directions of the first icon and the second icon taking the preset map as a reference.

In some embodiments, a presentation mode of the relative position relationship in the ground end may include a primary interface presentation mode and a secondary interface presentation mode which are switchable according to a selection of a user.

In some embodiments, the primary interface presentation mode may include: displaying the preset map and presenting the relative position relationship among the aerial vehicle, the ground end and the return target point in a main displaying interface of the ground end; and displaying a video image captured by the aerial vehicle and obtained in real time in a picture-in-picture displaying interface provided on the main displaying interface.

In some embodiments, the secondary interface presentation mode may include: displaying a video image captured by the aerial vehicle and obtained in real time in a main displaying interface; and displaying the preset map and presenting the relative position relationship among the aerial vehicle, the ground end and the return target point in a picture-in-picture displaying interface provided on the main displaying interface.

In some embodiments, the method may further include: detecting a moving distance of the ground end, resetting the position of the return target point to obtain updated third position information, when the detected moving distance is greater than a preset distance threshold; and displaying the return target point on the preset map, showing the relative position relationship between the aerial vehicle and the ground end, according to the updated third position information.

In some embodiments, the method may further include: detecting a distance of the aerial vehicle from the return target point; limiting a flight of the aerial vehicle, or resetting the return target point, or issuing a prompt of going beyond a distance limitation, when a detected distance value is greater than a preset return distance threshold.

In order to solve the above-described technical problems, the present disclosure provides an apparatus in a ground end for controlling an aerial vehicle. The apparatus includes a memory and at least one processor, coupled to the memory to execute computer-readable instructions stored on the memory to obtain first position information of the aerial vehicle and second position information of the ground end; and present a relative position relationship between the aerial vehicle and the ground end on preset map according to the first position information and the second position information.

In some embodiments, the at least one processor is further configured to: draw a first icon corresponding to the aerial vehicle on the preset map according to the first position information; draw a second icon corresponding to the ground end on the preset map according the second position information; draw a third icon corresponding to a return target point for the aerial vehicle on the preset map according to the third position information; and display the preset map drawn with the first icon, the second icon and the third icon.

In some embodiments, the at least one processor is further configured to: obtain first orientation information of the aerial vehicle and second orientation information of the ground end; and display an orientation of the aerial vehicle on the preset map according to the first orientation information; and display the orientation of the ground end on the preset map according to the second orientation information.

In some embodiments, the first icon and the second icon are icons with direction indication, and the at least one processor is further configured to: adjust a pointing direction of the first icon ace according to the first orientation information; and adjust the pointing direction of the second icon according to the second orientation information.

In some embodiments, the at least one processor is further configured to: display the preset map, the first icon, the second icon and the third icon within a displaying interface by at least one of the following three displaying modes: in a first displaying mode, setting the first orientation information as a reference direction and adjusting a displaying direction of the preset map, a pointing direction of the second icon using the first orientation information as a reference; in a second displaying mode, setting the second orientation information as the reference direction and adjusting the displaying direction of the preset map and the pointing direction of the first icon, taking the second orientation information as reference; and in a third displaying mode, setting a predetermined geographic direction on the preset map as the reference direction, and adjusting the pointing directions of the first icon and the second icon, taking the preset map as a reference.

In some embodiments, a presentation mode of the relative position relationship the map processing unit includes a primary interface presentation mode and a secondary interface presentation mode, which are switchable according to a selection of a user.

In some embodiments, the primary interface presentation mode includes: displaying the preset map and presenting the relative position relationship of the aerial vehicle, the ground end and the return target point in a main displaying interface of the ground end; and displaying a video image captured by the aerial vehicle and obtained in real time in a picture-in-picture displaying interface provided on the main displaying interface.

In some embodiments, the secondary interface presentation mode includes: displaying a video image captured by the aerial vehicle and obtained in real time in a main displaying interface; and displaying the preset map and presenting the relative position relationship of the aerial vehicle, the ground end and the return target point in a picture-in-picture displaying interface provided on the main displaying interface.

In some embodiments, the at least one processor is further configured to: detect a moving distance of the ground end, reset a position of the return target point to obtain updated third position information, when the detected moving distance is greater than a preset distance threshold; display the return target point on the preset map where the relative position relationship of the aerial vehicle and the ground end has been shown, according to the updated third position information; detect a distance of the aerial vehicle from the return target point; and limit a flight of the aerial vehicle, or reset the return target point, or issue a prompt of going beyond a distance limitation, when the detected distance value is greater than a preset return distance threshold.

The technical effect of the present disclosure is that: some embodiments by obtaining first position information of the aerial vehicle and second position information of a ground end; and presenting a relative position relationship between the aerial vehicle and the ground end on a preset map according to the first position information and the second position information, flight status including flight position and other suitable information of the aerial vehicle may be directly provided.

DETAILED DESCRIPTION OF THE DISCLOSURE

Figure 1:
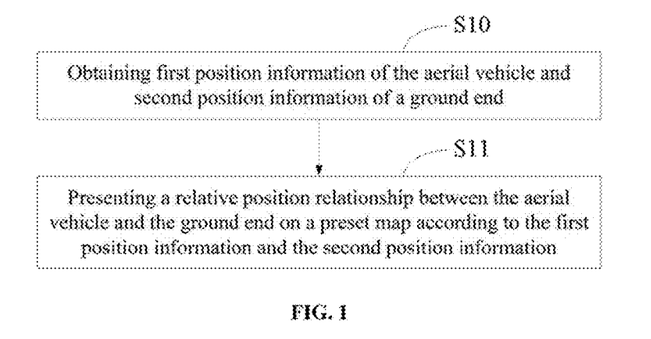
FIG. 1 is a schematic flow chart of an exemplary method of prompting a position of an aerial vehicle in accordance with some embodiments of the present disclosure.

FIG. 1 illustrates an exemplary method of prompting a position of an aerial vehicle in accordance with some embodiments of the present disclosure. As shown in FIG. 1, a method of prompting a position of an aerial vehicle may include the following.

In S10: first position information of the aerial vehicle and second position information of a ground end are obtained.

In some embodiments, the obtained first position information may include latitude and longitude of the aerial vehicle, as well as a flight height of the aerial vehicle. The obtained second position information may include latitude and longitude of the ground end, in the meantime may also include an orientation of a direction pointer representing the orientation of the ground end. The first position information may be obtained by a global positioning system (GPS) by positioning the aerial vehicle, an indicator for a GPS signal on the aerial vehicle may be used for indicating whether there is a GPS signal. In some embodiments, the indicator for the GPS signal with green light may represent that there is the GPS signal, and the indicator for the GPS signal with red light may represent that there is no GPS signal. The second position information may be obtained by the GPS by positioning the ground end. The ground end may be a handheld terminal, such as a mobile phone and the like, or a control terminal that may be remotely controlled, such as a computer and the like.

In S11: a relative position relationship between the aerial vehicle and the ground end is presented on a preset map according to the first position information and the second position information.

In some embodiments, the preset map may be displayed on a display screen of the ground end, a predetermined geographic direction of the preset map may be shown, for example, by a compass. In some embodiments of the present disclosure, the positions of the aerial vehicle and the ground end may be both presented in real time in the preset map, so that a user may know the relative position relationship there-between clearly. A status of the aerial vehicle, such as the flight position, can thus be provided directly.

In specific embodiments, third position information of a set return target point for the aerial vehicle may be obtained, and the return target point may be displayed on the map where the relative position relationship between the aerial vehicle and the ground end has been shown, according to the third position information. The obtained third position information may include a latitude and longitude of a set return target point for the aerial vehicle, and further may include simultaneously the latitude and longitude as well as a height of the return target point as desired. The third position information of the return target point for the aerial vehicle may be set through the ground end. Specifically, the third position information may be set according to one or more of the followings: a current position of the ground end, a current position of the aerial vehicle and a return position specified in the preset map. Various embodiments of the present disclosure may detect a moving distance of the ground end, reset the position of the return target point to obtain updated third position information, when the detected moving distance is greater than a preset distance threshold; and display the return target point on the map where the relative position relationship between the aerial vehicle and the ground end has been shown according to the updated third position information. Alternatively, various embodiments of the present disclosure may include detecting a distance of the aerial vehicle from the return target point; and limiting a flight of the aerial vehicle, or resetting the return target point, or issuing a prompt of going beyond a distance limitation, when the detected distance is greater than a preset return distance threshold. Therefore, in the course of flight of the aerial vehicle, the third position information may be reset at any moment, and the position indicated by the third position information may be any position on the preset map. The return target point may be a return target point where an aerial vehicle may return autonomously in the course of flight after a user's one-click for the return. Of course, the user may control to cancel the return of the aerial vehicle and the aerial vehicle may hover.

In some embodiments of the present disclosure, presenting the relative position relationship between the aerial vehicle and the ground end, as well as displaying the return target point, on the preset map, may include: drawing a first icon corresponding to the aerial vehicle on the preset map according to the first position information; drawing a second icon corresponding to the ground end on the preset map according to the second position information; drawing a third icon corresponding to the return target point on the preset map according to the third position information; and displaying the preset map drawn with the first icon, the second icon and the third icon.

In some embodiments of the present disclosure, first orientation information of the aerial vehicle and second orientation information of the ground end may be obtained. The first orientation information of the aerial vehicle may be obtained based on the orientation of a compass configured in the aerial vehicle. Likewise the second orientation information of the ground end may be obtained based on the orientation of the compass configured in the ground end. The orientation of the aerial vehicle may be displayed in the preset map according to the first orientation information, and the orientation of the ground end may be displayed on the preset map according to the second orientation information. The first icon and the second icon may be icons with direction indications; a pointing direction of the first icon may be adjusted according to the first orientation information, and a pointing direction of the second icon may be adjusted according to the second orientation information.

In some embodiments of the present disclosure, a gimbal may also be loaded on the aerial vehicle, and an image acquiring apparatus rotated by the gimbal may be loaded thereon. Therefore, various embodiments of the present disclosure may further include obtaining collected orientation information of the image acquiring apparatus disposed on the aerial vehicle; and displaying the obtained, collected orientation information at a specified position of the first icon on the preset map. In some embodiments, the collected orientation information by the image acquiring apparatus may be obtained by an angular sensor disposed on the gimbal.

In some embodiments of the present disclosure, the preset map, the first icon, the second icon and the third icon may be displayed in a displaying interface through at least one of the following three displaying modes.

In a first displaying mode, the first orientation information may be set as a reference direction, and a displaying direction of the preset map and a pointing direction of the second icon may be adjusted taking the first orientation information as a reference, that is, in an actual flight, when a flight direction of the aerial vehicle changes, the displaying direction of the first icon with directivity does not change, and the direction of the preset map and the displaying direction of the second icon of the ground end may change accordingly.

In a second displaying mode, the second orientation information may be set as the reference direction, and the displaying direction of the preset map and the pointing direction of the first icon may be adjusted taking the second orientation information as a reference. Similarly, when the direction of the ground end changes, the displaying direction of the second icon with directivity does not change, and the direction of the preset map and the displaying direction of the first icon may change.

In a third displaying mode, the predetermined geographic direction on the preset map may be set as the reference direction, and pointing directions of the first icon and the second icon may be adjusted taking the preset map as a reference. Similarly, the direction of the preset map may not change all the time; when the direction of the aerial vehicle changes, the pointing direction of the first icon may be adjusted; and when the direction of the ground end changes, the pointing direction of the second icon may just be changed.

The above-described three exemplary displaying modes may be switchable arbitrarily with one another in the course of flight of the aerial vehicle. A presentation mode of the relative position relationship in the ground end may include a primary interface presentation mode and a secondary interface presentation mode which may be switchable according to a selection of a user. A user may switch between the primary interface presentation mode and the secondary interface presentation mode by operations such as clicking or sliding operations at the ground end. The primary interface presentation mode may include: displaying the preset map and presenting the relative position relationship among the aerial vehicle, the ground end and the return target point in a main displaying interface of the ground end; and displaying a video image captured by the aerial vehicle and obtained in real time in a picture-in-picture displaying interface provided on the main displaying interface.

Figure 2:
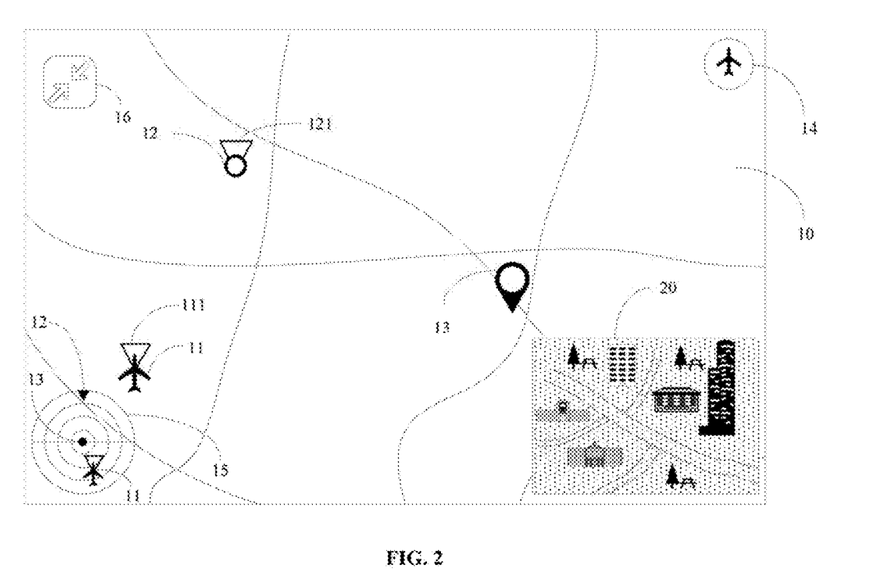
FIG. 2 is a schematic diagram of an exemplary presentation mode of a primary interface presentation mode for a position of an aerial vehicle in accordance with some embodiments of the present disclosure.
Figure 3:
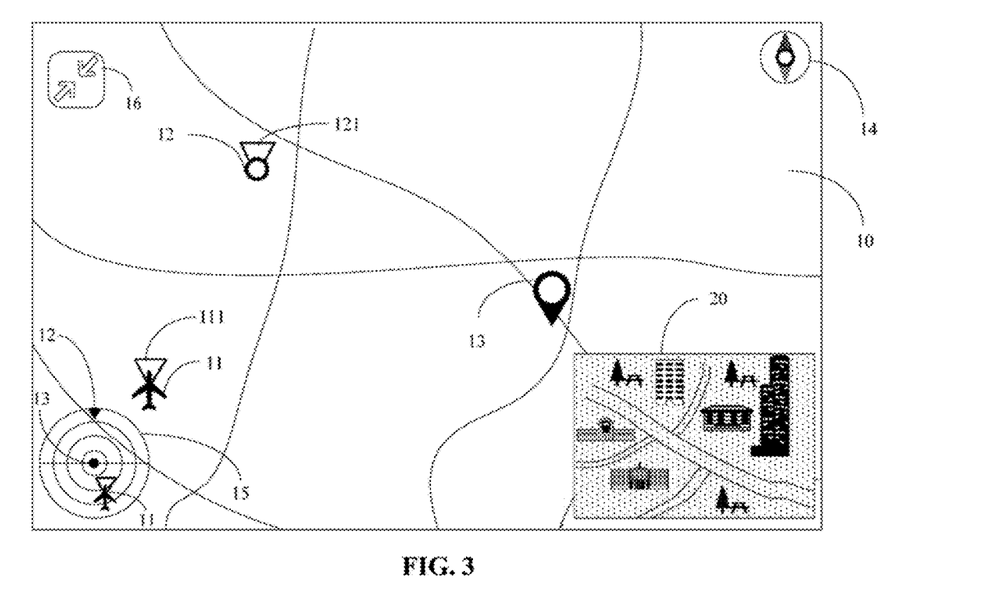
FIG. 3 is a schematic diagram of another exemplary presentation mode of a primary interface presentation mode for a position of an aerial vehicle in accordance with some embodiments of the present disclosure.
Figure 4:
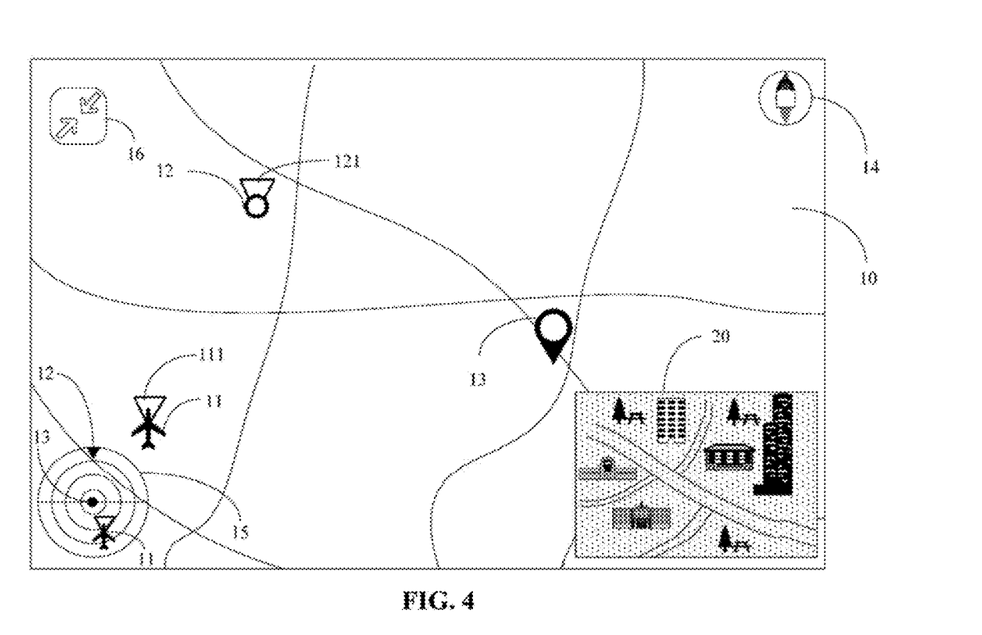
FIG. 4 is a schematic diagram of another exemplary presentation mode of a primary interface presentation mode for a position of an aerial vehicle in accordance with some embodiments of the present disclosure.

Referring to FIG. 2 to FIG. 4, FIG. 2 is a schematic diagram of an exemplary presentation mode of the primary interface presentation mode for a position of an aerial vehicle in accordance with some embodiments of the present disclosure. FIG. 3 is a schematic diagram of another exemplary presentation mode of the primary interface presentation mode for a position of an aerial vehicle in accordance with some embodiments of the present disclosure, and FIG. 4 is a schematic diagram of another exemplary presentation mode of the primary interface presentation mode for a position of an aerial vehicle in accordance with some embodiments of the present disclosure. A preset map 10 may be displayed in a main displaying interface, and a first icon 11 corresponding to the aerial vehicle and a pointing direction of the first icon 11, a second icon 12 corresponding to a ground end and a pointing direction 121 of the second icon 12, and a third icon 13 corresponding to a return target point, may be presented on the preset map 10. A video image 20 captured by the aerial vehicle and obtained in time may be displayed in a picture-in-picture displaying interface on the main displaying interface. In some embodiments, the position where the first icon 11 is may represent first position information of the aerial vehicle, the pointing direction 111 of the first icon 11 may represent first orientation information of the aerial vehicle, the position where the second icon 12 is may represent second position information of the ground end, and the pointing direction 121 of the second icon 12 may represent second orientation information of the ground end 12. The first position information may include latitude and longitude as well as a flight height of the aerial vehicle. A compass 14 in FIG. 2 may represent that the first orientation information is set as a reference direction and a displaying direction of the preset map 10 and the pointing direction of the second icon 12 may be adjusted taking the first orientation information as a reference. Specifically, a compass mode may take the direction of the aerial vehicle as a right-ahead direction. In this case, the right-ahead direction of a current position of the aerial vehicle is used as a reference direction, while the preset map 10, the ground end and the other reference objects may move relative to the aerial vehicle. The compass 14 in FIG. 3 may represent that the second orientation information is set as the reference direction, and the displaying direction of the preset map 10 and the pointing direction of the first icon 11 may be adjusted taking the second orientation information as a reference. That is, a compass mode may take the direction of the ground end as a right-ahead direction. In this case, as the second orientation information of the ground end changes, other reference objects may move accordingly. In some embodiments of the present disclosure, this compass mode is used as a default mode. The compass 14 in FIG. 4 may represent that a predetermined geographic direction on the preset map 10 is set as the reference direction, and the pointing directions of the first icon 11 and the second icon 12 may be adjusted taking the preset map 10 as reference. That is, when taking the due north direction of the preset map 10 as a reference document, the aerial vehicle and other reference objects may move relative to this direction. An attitude ball 15 is displayed at the lower right corner in FIG. 2, which is used for presenting the latitude and longitude of the aerial vehicle, the ground end and the return target point, as well as the flight height of the aerial vehicle.

In some embodiments of the present disclosure, the method may further include detecting a relative distance between the aerial vehicle and the ground end; determining whether the relative position relationship between the aerial vehicle and the ground end can be displayed completely under a current zoom level of the preset map 10, according to the detected relative distance; and updating the zoom level of the preset map 10 to display completely the relative position relationship between the aerial vehicle and the ground end, when the relative position relationship is determined unable to be displayed completely. Alternatively, the method may further include: detecting the relative distance between the aerial vehicle, the ground end and the return target point; determining whether the relative position relationship among the aerial vehicle, the ground end and the return target point can be displayed completely under the current zoom level of the preset map 10 according to the detected relative distance; and adjusting the zoom level of the preset map 10 to display completely the relative position relationship among the aerial vehicle, the ground end and the return target point, when the relative position relationship is determined unable to be displayed completely. As shown in FIG. 2, a zoom button 16 may also be presented on the preset map 10 for zooming in and out. After the aerial vehicle flies away over a period of time with a current map level, the second icon 12 corresponding to the ground end and the third icon 13 corresponding to the return target point may not be seen on the preset map. At this time, the zoom button 16 on the present map 10 may be clicked. After a click and selection operation of the zoom button 16 in the preset map 10 is detected, a control of zooming and displaying may be performed on the preset map 10 based on the click and selection operation to zoom the preset map 10 to a level that the relative position relationship of the first icon 11, the second icon 12 and the third icon 13 may be displayed simultaneously. When the zoom button 16 is clicked again, the original position level of the aerial vehicle may be restored.

Figure 5:
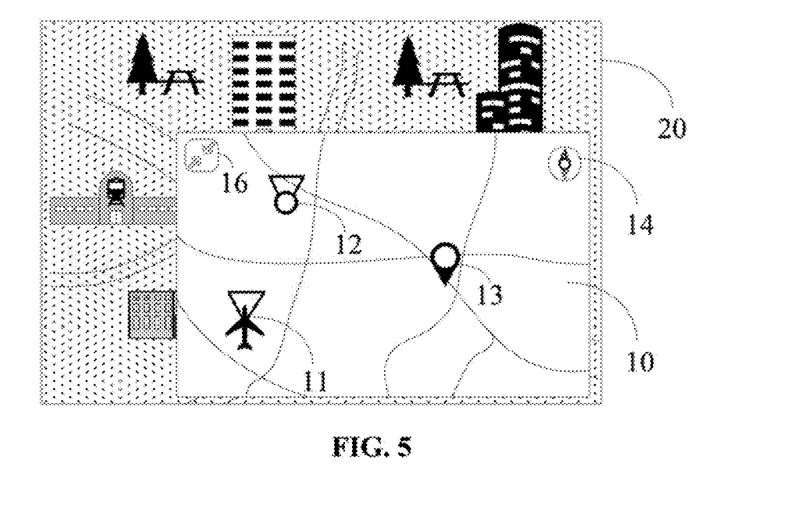
FIG. 5 is a schematic diagram of a secondary presentation mode for a position of an aerial vehicle in accordance with some embodiments of the present disclosure.

FIG. 5 is a schematic diagram of an exemplary secondary interface presentation mode for a position of an aerial vehicle in accordance with some embodiments of the present disclosure. As shown in FIG. 5, the secondary interface presentation mode may include: displaying a video image captured by the aerial vehicle and obtained in real time in a main displaying interface; displaying a preset map and presenting a relative position relationship among the aerial vehicle, a ground end and a return target point in a picture-in-picture displaying interface provided on the main displaying interface. Referring to FIG. 5, the video image 20 captured by the aerial vehicle and obtained in real time may be displayed in the main displaying interface, the preset map 10 may be displayed in the picture-in-picture displaying interface on the main displaying interface, and a first icon 11 corresponding to the aerial vehicle and a pointing direction of the first icon 11, a second icon 12 corresponding to the ground end and a pointing direction of the second icon 12 and a third icon corresponding to a return target point may be presented on the preset map 10. A compass 14 may represent that a predetermined geographic direction on the preset map 10, which may be set as a reference direction. The pointing directions of the first icon 11 and the second icon 12 may be adjusted taking the preset map 10 as a reference. In some embodiments, there may be three exemplary modes, as similarly described above, for displaying the preset map and presenting the relative position relationship among the aerial vehicle, the ground end and the return target point in the picture-in-picture displaying interface provided on the main displaying interface. As such, the status of the aerial vehicle, such as a flight position and the like, may be provided directly according to the positions of the first icon 11, the second icon 12 and the third icon 13 on the preset map. Moreover, a user may control, in real time, a flight status of the aerial vehicle or control the aerial vehicle to shoot pictures and video, directly according to the first position information and the first orientation information of the aerial vehicle, the second position information and the second orientation information of the ground end, and the third position information of the return target point presented on the preset map 10.

Figure 6:
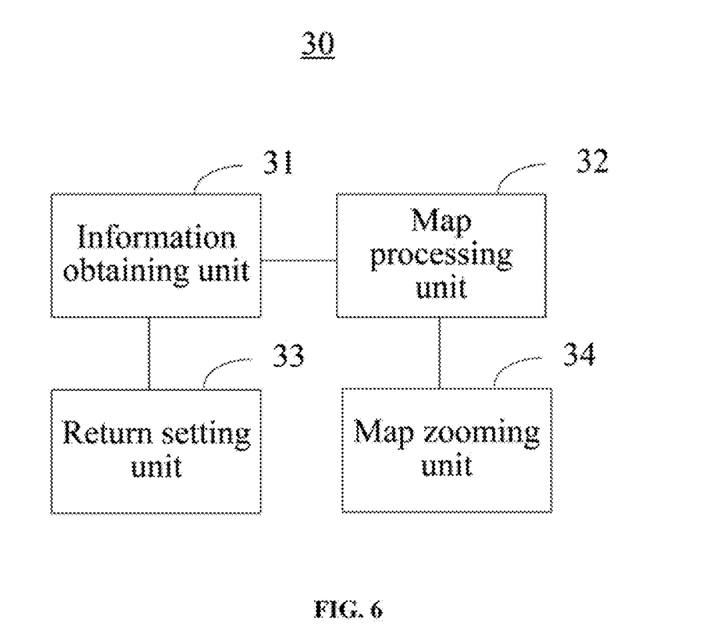
FIG. 6 is structural schematic diagram of a ground end in accordance with some embodiments of the present disclosure.

FIG. 6 is a structural schematic diagram of an exemplary ground end in accordance with some embodiments of the present disclosure. As shown in FIG. 6, the ground end 30 for controlling an aerial vehicle may include: an information obtaining unit 31, a map processing unit 32, a return setting unit 33 and a map zooming unit 34. The information obtaining unit 31 may be configured for obtaining first position information of a position where the aerial vehicle is and second position information of the ground end 30; the map processing unit 32 may be connected with the information obtaining unit 31, and configured for presenting a relative position relationship between the aerial vehicle and the ground end 30 on a preset map according to the first position information and the second position information. In some embodiments, the obtained first position information may include latitude and longitude of the aerial vehicle and a flight height of the aerial vehicle. The obtained second position information may include latitude and longitude of the ground end 30 and an orientation of a direction pointer itself representing the orientation of the ground end. The first position information may be obtained by a GPS positioning on the aerial vehicle, an indicator for a GPS signal on the aerial vehicle may be used for showing whether there is the GPS signal. In some embodiments, the indicator for the GPS signal with green light may represent that there is a GPS signal, and the indicator for the GPS signal with red light may represent that there is no GPS signal. While the second position information may be obtained by a GPS by positioning the ground end 30, the preset map may be displayed on a display screen of the around end, and the predetermined geographic direction of the preset map may be shown by the compass.

In some embodiments of the present disclosure, the information obtaining unit 31 may be further configured for obtaining third position information of a set return target point for the aerial vehicle; the map processing unit 32 may further be configured for displaying the return target point on a map where the relative position relationship between the aerial vehicle and the ground end 30 has been shown according to the third position information. In some embodiments, the third position information may include latitude and longitude of the set return target point for the aerial vehicle, and further, may also simultaneously include the latitude and longitude as well as a height of the set return target point as desired. The third position information in the course of flight of the aerial vehicle may be reset at any moment. The return setting unit 33 may be configured for setting the third position information, specifically, for one or more of the followings: setting the third position information as a current position of the ground end 30, setting the third position information as the current position of the aerial vehicle, or designating a return position on the preset map as the third position information. The return setting unit 33 may be configured for detecting a moving distance of the ground end, resetting a position of the return target point to obtain updated third position information, when the detected moving distance is greater than a preset distance threshold, and displaying the return target point on the map where the relative position relationship between the aerial vehicle and the ground end 30 has been shown according to the updated third position information. Alternatively, the return setting unit 33 may be configured for limiting a flight of the aerial vehicle, resetting the return target point or issuing a prompt of going beyond a distance limitation, when the detected distance value is greater than a preset return distance threshold. Therefore the return setting unit 33 may set the position indicated by the third position information as any position on the preset map. The return target point may be a return target point where an aerial vehicle may return to autonomously in the course of flight after as user's one-click for the return. Of course, the user may control to cancel the return of the aerial vehicle and the aerial vehicle may hover.

The presenting a relative position relationship between an aerial vehicle and a ground end 30 on a preset map, and displaying a return target point by the map processing unit 32 may include: drawing a first icon corresponding to the aerial vehicle on the preset map according to the first position information; drawing a second icon corresponding to the ground end 30 on the preset map according to the second position information; drawing a third icon corresponding to the return target point on the preset map according to the third position information; then displaying the preset map where the first icon, the second icon and the third icon have been drawn. The first icon and the second icon may be icons with direction indication. The information obtaining unit 31 may further be configured for obtaining first orientation information of the aerial vehicle and second orientation information of the ground end 30. The first orientation information of the aerial vehicle may be obtained based on the orientation of a compass configured in the aerial vehicle, the second orientation information of the ground end 30 likewise may be obtained based on the orientation of a compass configured in the ground end 30. The map processing unit 32 may be further configured for displaying the orientation of the aerial vehicle on the preset map according to the first orientation information, and displaying the orientation of the ground end 30 on the preset map according to the second orientation information. Specifically, the map processing unit 32 may adjust the pointing direction of the first icon according to the first orientation information; and adjust the pointing direction of the second icon according to the second orientation information.

In some embodiments of the present disclosure, a gimbal may be loaded on the aerial vehicle, and an image acquiring apparatus rotated by the gimbal may be loaded thereon. Therefore, the information acquiring unit 31 may be further configured for obtaining collected orientation is for of the image acquiring apparatus disposed on the aerial vehicle, while the map processing unit 32 may be further configured for displaying the obtained, collected orientation information at a specified position of the first icon on the preset map. In some embodiments, the collected orientation information of the image acquiring apparatus may be obtained by an angular sensor disposed on the gimbal.

In some embodiments of the present disclosure, the map zooming unit 34 may be configured for detecting a relative distance between the aerial vehicle and the ground end 30; determining whether the relative position relationship between the aerial vehicle and the ground end 30 can be displayed completely under a current zoom level of the preset map, according to the detected relative distance; and updating the zoom level of the preset map to display completely the relative position relationship between the aerial vehicle and the ground end, when the relative position relationship is determined unable to be displayed completely. Alternatively, the map zooming unit 34 may further be configured for detecting the relative distance between the aerial vehicle, the ground end 30 and the return target point; determining whether the relative position relationship between the aerial vehicle, the ground end 30 and the return target point can be displayed completely under the current zoom level of the preset map according to the detected relative distance; and adjusting the zoom level of the preset map to display completely the relative position relationship between the aerial vehicle, the ground end and the return target point, when the relative position relationship is determined unable to be displayed completely. Specifically, a zoom button may also be presented on the preset map for zooming in and out. After the aerial vehicle flies away over a period of time with a current map level, the second icon corresponding to the ground end 30 and the third icon corresponding to the return target point may not be seen on the preset map. At this time the zoom button on the preset map may be clicked. After a click and selection operation of the zoom button on the preset map is detected, a control of zooming and displaying may be performed on the preset map based on the click and selection operation to zoom the preset map to a level that the relative position relationship of the first icon, the second icon and the third icon may be displayed simultaneously. When the zoom button is clicked again, the original position level of the aerial vehicle may be restored.

In some embodiments of the present disclosure, the map processing unit 32 may be configured for displaying the preset map, the first icon, the second icon and the third icon within a displaying interface through at least one of the following three exemplary displaying modes: in a first displaying mode, the first icon may be set as a predetermined direction pointing to the displaying interface, and the preset map, the second icon and the third icon may be adjusted taking the first icon as a reference. Specifically, a compass mode may take the direction of the aerial vehicle as a right-ahead direction. In this case, the right-ahead direction of a current position of the aerial vehicle is used as a reference direction. The preset map, the ground end 30 and other reference objects may move relative to the aerial vehicle. In a second displaying mode, the second icon may be set as the predetermined direction pointing to the displaying interface, and the preset map, the first icon and the third icon may be adjusted taking the second icon as a reference. That is, a compass mode may take the direction of the ground end as a right-ahead direction. At this time as second orientation information of the ground end 30 changes, other reference objects may move relatively. In some embodiments of the present disclosure, this compass mode may be used as a default mode. In third displaying mode, a predetermined geographic direction on the preset map may be set as the predetermined direction pointing to the displaying interface, and the first icon, the second icon and the third icon may be adjusted taking the preset map as a reference. That is, the reference direction is a due north direction of the preset map, at this time the aerial vehicle and other reference objects may move relative to this direction. The above-described three exemplary displaying modes may be switchable arbitrarily in the course of flight of the aerial vehicle by a user. While a presentation mode of the relative position relationship by the map processing unit 32 may include a primary interface presentation mode and a secondary interface presentation mode which may be switchable according to a selection of a user. The user may switch between the primary interface presentation mode and the secondary interface presentation mode by operations such as clicking or sliding operations at the ground end 30. The primary interface presentation mode may include: displaying the preset map and presenting the relative position relationship among the aerial vehicle, the ground end 30 and the return target point in a main displaying interface of the ground end 30; and displaying a video image captured by the aerial vehicle and obtained in real time in a picture-in-picture displaying interface provided on the main displaying interface. The secondary interface presentation mode may include: displaying a video image captured by the aerial vehicle and obtained in real time in a main displaying interface, and displaying a preset map and presenting a relative position relationship among the aerial vehicle, a ground end 30 and a return target point in a picture-in-picture displaying interface provided on the main displaying interface. In the primary interface presentation mode or the secondary interface presentation mode, the above-described three exemplary displaying modes may be employed to display the preset map, the first icon, the second icon and the third icon, that is, the above-described three displaying modes are used to display the preset map and present the relative position relationship among the aerial vehicle, the ground end 30 and the return target point. The ground end 30 may present by the map processing unit 32, on the preset map the first position information and the first orientation information of the aerial vehicle, the second position information and the second orientation information of the ground end 30, as well as the third position information of the return target point obtained by the information obtaining unit 31, a user may be provided directly with a status of the aerial vehicle, such as a flight position and other information, to better control the aerial vehicle.

In some embodiments of the present disclosure, the ground end 30 may be a handheld terminal, such as a mobile phone and the like, or a control terminal that may be remotely controlled, such as a computer and the like. The ground end 30 may use one-click to control takeoff and landing of an aerial vehicle, set modes of a remote controller and image quality of captured images or video returned by the aerial vehicle and so on. The ground end 30 may further control the aerial vehicle to perform yaw locking, return target point locking, target point locking in the course of flight, or control a flight of the aerial vehicle to be consistent with a movement of the ground end 30. The ground end 30 may also be provided with a master and slave machine serving as a data center of a remote controller, the aerial vehicle may return data to the ground end 30 in real time to ensure all data from beginning to end of a task of the aerial vehicle to be saved, and a user may view previous flight information and playback a route of a task and share this task with other aerial vehicles or allow other aerial vehicles to perform this task. The ground end 30 may have an additional self-test function, so that when an abnormity occurs to an aerial vehicle, a user may only need to use one-click to detect status information of various components of the aerial vehicle to obtain a solution.

The disclosed apparatus, system and method may be implemented in any suitable manners. For example, the above described system embodiments are merely exemplary. The division of the modules or units may be a logic function division, and other division manners may be employed when it is practiced actually. For example, more units or components may be combined or may be integrated into another system. Alternatively, some features may omitted or may not be performed. Additionally, couplings or direct couplings or communication connections between one another components, as displayed or discussed herein, may be via some interfaces and/or may be coupled or connected electrically, mechanically, or other forms.

Units described as separate parts may or may not be separated physically. Components displayed as units may or may not be physical units, i.e. may be located in one place, or may be distributed onto a plurality of network units. Some or all of the units may be selected in order to achieve the objectives of the solutions of various embodiments according to the actual requirements.

Additionally, various functional units in various embodiments according to the present disclosure may be integrated into one processing unit, or may be physically individuals. Two or more of various function units may be integrated into one unit. The above integrated unit may be implemented in a form of hardware or in a form of functional units of software.

The integrated units, when being implemented to a form of functional units of software and being independent products for sale and use, may be stored in a computer-readable storage medium (or a memory), such as a non-transitory computer-readable storage medium. Based on such understandings, the technical solution of the present disclosure or the part of which contributes over the prior art or some or all of the technical solution may be embodied in a form of a software product. The software product may be stored in a storage medium, and may include instructions for causing a computer device (which may be a personal computer, a server, or a network device or the like) or a processor to execute some or all of the exemplary steps of the methods in various embodiments according to the present disclosure. The above-mentioned storage medium may include: a U disk, a movable hard disc, a Read-Only Memory (ROM), a random access memory (RAM), a diskette or an optical disc and various medium capable of storing program codes.

In this manner, the present disclosure allows flight status including flight position and other suitable information of the aerial vehicle to be provided directly, for example, by obtaining first position information of the aerial vehicle and second position information of a ground end, setting third position information of a return target point for the aerial vehicle; and presenting a relative position relationship among the aerial vehicle, the ground end and the return target point according to the first position information, the second position information and the third position information.

The foregoing disclosure is merely illustrative of some embodiments of the invention but not intended to limit the scope of the invention. Any equivalent modifications to a structure or workflow, which are made utilizing the specification and the drawings of the present disclosure, and a direct or indirect application in other relevant technical fields, shall fall into the scope of the present disclosure.

What is claimed is:

1. A method of prompting a position of an aerial vehicle, comprising:
   obtaining first position information of the aerial vehicle and second position information of a terminal configured to control the aerial vehicle;
   presenting a relative position relationship between the aerial vehicle and the terminal on a preset map according to the first position information and the second position information;
   obtaining first orientation information of the aerial vehicle and second orientation information of the terminal; and
   displaying the preset map in a displaying interface aligned with a reference direction, the reference direction being dynamically determined based on at least one of the first orientation information or the second orientation information.

2. The method of claim 1, further comprising:
   obtaining third position information of a set return target point for the aerial vehicle, and
   displaying the set return target point on the preset map showing the relative position relationship of the aerial vehicle and the terminal, according to the third position information.

3. The method of claim 2, wherein presenting the relative position relationship of the aerial vehicle and the terminal on the preset map and displaying the return target point comprise:
   drawing a first icon corresponding to the aerial vehicle on the preset map according to the first position information;
   drawing a second icon corresponding to the terminal on the preset map according to the second position information;
   drawing a third icon corresponding to the return target point on the preset map according to the third position information; and
   displaying the preset map drawn with the first icon, the second icon and the third icon.

4. The method of claim 3, further comprising:
   displaying an orientation of the aerial vehicle on the preset map according to the first orientation information; and
   displaying an orientation of the terminal on the preset map according to the second orientation information.

5. The method of claim 4, wherein:
   the first icon and the second icon are icons with direction indication;
   displaying the orientation of the aerial vehicle on the preset map according to the first orientation information comprises: adjusting a pointing direction of the first icon according to the first orientation information; and displaying the orientation of the terminal on the preset map according to the second orientation information comprises: adjusting a pointing direction of the second icon according to the second orientation information.

6. The method of claim 5, wherein displaying the preset map drawn with the first icon, the second icon and the third icon comprises:
adjusting at least one of a displaying direction of the preset map, a pointing direction of the first icon, and a pointing direction of the second icon according to the reference direction.

7. The method of claim 1, wherein a presentation mode of the relative position relationship in the terminal comprises a primary interface presentation mode and a secondary interface presentation mode, which are switchable according to a selection of a user.

8. The method of claim 7, wherein the primary interface presentation mode comprises:
displaying the preset map and presenting the relative position relationship of the aerial vehicle, the terminal and the return target point in a main displaying interface of the terminal; and
displaying a video image captured by the aerial vehicle and obtained in real time in a picture-in-picture displaying interface provided on the main displaying interface.

9. The method of claim 7, wherein the secondary interface presentation mode comprises:
displaying a video image captured by the aerial vehicle and obtained in real time in a main displaying interface of the terminal; and
displaying the preset map and presenting the relative position relationship of the aerial vehicle, the terminal and the return target point in a picture-in-picture displaying interface provided on the main displaying interface.

10. The method of claim 2, further comprising:
detecting a moving distance of the terminal from a first location to a second location, resetting a position of the return target point to obtain updated third position information, when the detected moving distance is greater than a preset distance threshold; and
displaying the return target point on the preset map where the relative position relationship of the aerial vehicle and the terminal has been shown, according to the updated third position information.

11. The method of claim 2, further comprising:
detecting a distance of the aerial vehicle from the return target point; and
limiting a flight of the aerial vehicle, or resetting the return target point, or issuing a prompt of going beyond a distance limitation, when the detected distance value is greater than a preset return distance threshold.

12. The method of claim 1, wherein presenting the relative position relationship on the preset map includes:
determining a relative distance between the aerial vehicle and the terminal;
determining, according to the relative distance, a zoom level for completely displaying the relative position relationship; and
presenting the relative position relationship on the preset map according to the first position information, the second position information, and the determined zoom level.

13. A terminal for controlling an aerial vehicle, comprising:
a memory; and
at least one processor, coupled to the memory to execute computer-readable instructions stored on the memory to:
obtain first position information of the aerial vehicle and second position information of the terminal; and
present a relative position relationship between the aerial vehicle and the terminal on a preset map according to the first position information and the second position information;
obtain first orientation information of the aerial vehicle and second orientation information of the terminal; and
display the preset map in a displaying interface aligned with a reference direction, the reference direction being dynamically determined based on at least one of the first orientation information or the second orientation information.

14. The terminal of claim 13, wherein the at least one processor is further configured to:
draw a first icon corresponding to the aerial vehicle on the preset map according to the first position information;
draw a second icon corresponding to the terminal on the preset map according to the second position information;
draw a third icon corresponding to a return target point for the aerial vehicle on the preset map according to third position information of the return target point; and
display the preset map drawn with the first icon, the second icon and the third icon.

15. The terminal of claim 14, wherein the at least one processor is further configured to:
display an orientation of the aerial vehicle on the preset map according to the first orientation information; and
display an orientation of the terminal on the preset map according to the second orientation information.

16. The terminal of claim 15, wherein:
the first icon and the second icon are icons with direction indication, and
the at least one processor is further configured to:
adjust a pointing direction of the first icon according to the first orientation information; and
adjust a pointing direction of the second icon according to the second orientation information.

17. The terminal of claim 16, wherein the at least one processor is further configured to:
adjust at least one of a displaying direction of the preset map, a pointing direction of the first icon, and a pointing direction of the second icon according to the reference direction.

18. The terminal of claim 13, wherein a presentation mode of the relative position relationship in the terminal comprises a primary interface presentation mode and a secondary interface presentation mode, which are switchable according to a selection of a user.

19. The terminal of claim 18, wherein the primary interface presentation mode comprises:
displaying the preset map and presenting the relative position relationship of the aerial vehicle, the terminal and a return target point in a main displaying interface of the terminal; and
displaying a video image captured by the aerial vehicle and obtained in real time in a picture-in-picture displaying interface provided on the main displaying interface.

20. The terminal of claim 18, wherein the secondary interface presentation mode comprises:

displaying a video image captured by the aerial vehicle and obtained in real time in a main displaying interface; and displaying the preset map and presenting the relative position relationship of the aerial vehicle, the terminal and a return target point in a picture-in-picture displaying interface provided on the main displaying interface.

21. The terminal of claim 13, wherein the at least one processor is further configured to:

detect a moving distance of the terminal from a first location to a second location;

reset a position of a return target point to obtain updated third position information of the return target point, when the detected moving distance is greater than a preset distance threshold;

display the return target point on the preset map where the relative position relationship of the aerial vehicle and the terminal has been shown, according to the updated third position information;

detect a distance of the aerial vehicle from the return target point; and limit a flight of the aerial vehicle, or reset the return target point, or issue a prompt of going beyond a distance limitation, when the detected distance value is greater than a preset return distance threshold.

* * * * *